(12) United States Patent
Liu et al.

(10) Patent No.: US 9,854,447 B2
(45) Date of Patent: Dec. 26, 2017

(54) METHOD AND DEVICE FOR CONFIGURING COGNITIVE RADIO SYSTEM SPECTRUM RESOURCES

(71) Applicant: ZTE CORPORATION, Shenzhen, Guangdong Province (CN)

(72) Inventors: Xing Liu, Shenzhen (CN); Yan Li, Shenzhen (CN); Bin Wang, Shenzhen (CN); Longtao Ren, Shenzhen (CN)

(73) Assignee: XI'AN ZHONGXING NEW SOFTWARE CO., LTD., Xi'an, Shaanxi (CN)

( * ) Notice: Subject to any disclaimer, the term of this patent is extended or adjusted under 35 U.S.C. 154(b) by 0 days.

(21) Appl. No.: 15/113,445

(22) PCT Filed: Aug. 25, 2014

(86) PCT No.: PCT/CN2014/085126
§ 371 (c)(1),
(2) Date: Jul. 22, 2016

(87) PCT Pub. No.: WO2015/109841
PCT Pub. Date: Jul. 30, 2015

(65) Prior Publication Data
US 2017/0006475 A1    Jan. 5, 2017

(30) Foreign Application Priority Data

Jan. 24, 2014  (CN) .......................... 2014 1 0036519

(51) Int. Cl.
*H04W 16/14* (2009.01)
*H04B 17/336* (2015.01)
(Continued)

(52) U.S. Cl.
CPC .......... *H04W 16/14* (2013.01); *H04B 17/336* (2015.01); *H04L 5/006* (2013.01);
(Continued)

(58) Field of Classification Search
None
See application file for complete search history.

(56) References Cited

U.S. PATENT DOCUMENTS

2010/0330919 A1   12/2010   Gurney et al.
2011/0286401 A1   11/2011   Wijting et al.
(Continued)

FOREIGN PATENT DOCUMENTS

CN   101686478 A   1/2010
CN   102958174 A1  3/2013
(Continued)

*Primary Examiner* — Anh Ngoc Nguyen
(74) *Attorney, Agent, or Firm* — Ling Wu; Stephen Yang; Ling and Yang Intellectual Property

(57) ABSTRACT

A method and device for configuring cognitive radio system spectrum resources, relates to the field of wireless communication and solves the problem that the existing resource configuration mode influences system stability. The method includes: receiving, by a reconfiguration management node, idle spectrum resource request information transmitted by secondary user equipment, wherein the idle spectrum resource request information indicates a demand of the secondary user equipment for idle spectrum resources; and performing, by the reconfiguration management node, an idle spectrum resource configuration decision for the secondary user equipment according to current idle spectrum resource information and historical configuration information of the idle spectrum resources of the secondary user equipment. The technical solution provided by the embodiment of the present document is applicable to radio service, and realizes higher-efficiency idle spectrum resource configuration decision on the basis of historical data.

15 Claims, 7 Drawing Sheets

(51) Int. Cl.
*H04L 5/00* (2006.01)
*H04L 12/26* (2006.01)
*H04W 4/02* (2009.01)
*H04W 88/02* (2009.01)

(52) U.S. Cl.
CPC ............ *H04L 5/0073* (2013.01); *H04L 43/16* (2013.01); *H04W 4/023* (2013.01); *H04W 88/02* (2013.01)

(56) References Cited

U.S. PATENT DOCUMENTS

| | | | |
|---|---|---|---|
| 2012/0058790 A1 | 3/2012 | Junell et al. | |
| 2012/0071188 A1* | 3/2012 | Wang | H04W 16/14 455/509 |
| 2012/0257585 A1 | 10/2012 | Sydor et al. | |
| 2014/0024405 A1* | 1/2014 | Qiu | H04W 16/14 455/509 |
| 2014/0086081 A1* | 3/2014 | Mack | H04L 5/006 370/252 |
| 2015/0063106 A1* | 3/2015 | Devi | H04L 47/19 370/235 |

FOREIGN PATENT DOCUMENTS

| | | | |
|---|---|---|---|
| CN | 103260163 A | 8/2013 | |
| CN | 103533550 A | 1/2014 | |
| EP | 2530970 A1 | 12/2012 | |
| EP | 2605441 A1 | 6/2013 | |

\* cited by examiner

METHOD AND DEVICE FOR CONFIGURING COGNITIVE RADIO SYSTEM SPECTRUM RESOURCES

TECHNICAL FIELD

The present document relates to the field of wireless communication, in particular to a method and a device for configuring cognitive radio system spectrum resources.

BACKGROUND OF THE RELATED ART

With the continuous progress of radio technology, various radio services emerge greatly. However, spectrum resources on which the radio services rely are limited. In one aspect, with the continuous increase of demands of people for bandwidth, the spectrum resources are in a situation of great shortage; and in another aspect, under the traditional fixed spectrum allocation mode, the utilization rate of the spectrum resources is not high. In a certain sense, this spectrum allocation mechanism of fixed allocation to authorized systems causes the situation of great shortage in spectrum resources. Cognitive radio technology breaks the traditional fixed spectrum allocation mechanism, the spectrums are dynamically allocated among the systems and thus the use efficiency of the spectrum is improved. Typically, with the continuous increase of daily communication demands of people, people feel unsatisfied with simple voice and data communication, the proportion of video stream media services in communication of people is continuously increased, this needs a support of greater bandwidth, and the IMT (International Mobile Telecom) system is in an unprecedented situation of shortage in spectrum. For a broadcast television system, there is a utilization space to a very great extent in spectrum resources. For example, some broadcast television system spectrums are not used in some regions; and although some broadcast television system spectrums cover some regions, the spectrums are not used at some periods, and the overall utilization rate is low. However, due to the fixed spectrum allocation mode, the unused spectrum resources cannot be utilized again, e.g., cannot be used by IMT. With the cognitive radio technology, the IMT system can opportunistically occupy spectrum resources (TVWS, TV White Space) of radio and television systems which are unused in space and time by acquiring broadcast television system information, so as to increase the utilization rate of broadcast television system spectrums and improve the situation of shortage in IMT system spectrums. Similar technologies comprise non-license shared spectrum technologies, typically such as TVWS frequency band CR technology; and LSA (License Shared Access) technology.

For the above-mentioned two spectrum usage modes that secondary systems opportunistically occupy or share primary system spectrum resources in a licensed way, effective protection towards primary users must be guaranteed, i.e., when the secondary systems use the primary system spectrum resources, no harmful interference with primary system users is generated, which is a premise that the cognitive radio technology can be realized. In order to achieve the purpose, in an interference scenario as shown in FIG. 1, firstly, the used spectrum and transmitting parameters of the secondary system will be restricted by requirements of primary system protection and an accurate decision needs to be performed at the very beginning when these parameters are determined; and secondly, the secondary system needs to know the emergence of primary users in time, so as to exit from the spectrum resources in time and avoid the interference with the primary users when the primary users re-emerge on the spectrum resources occupied by the secondary system.

Further, since there are possibly multiple secondary user equipment simultaneously using primary system idle spectrums, in an interference scenario as shown in FIG. 2, another necessary condition that TVWS can be used is that all secondary systems can coexist on TVWS and use TVWS resources without mutual interference, i.e., mutual interference is within a tolerable range. Therefore, avoidance of interference among secondary systems is also a factor which must be considered during spectrum resource allocation decision.

In the above-mentioned process, the spectrum resource reconfiguration decision needs to consider the coexistence demand of the two aspects to make the configuration decision of the spectrum resources, and this is a critical step in the CR technology. In addition, due to factors such as emergence of primary users and change of interference relationships between secondary users, the configuration of the spectrum resources possibly needs to be frequently changed and thus the spectrum resource reconfiguration decision also needs to be frequently performed. In the related art, decision needs to be performed again at each time of spectrum resource reconfiguration, existing empirical data of spectrum resource reconfiguration are not used, acquisition and processing of related information are involved in a spectrum resource reconfiguration process at each time, a series of operations such as calculation of configuration parameters are needed, consequently the system costs greater processing overhead, configuration time delay, and overhead for interaction of related signaling. In addition, since the made reconfiguration decision is not verified by actual configuration, the configuration target of the secondary users is not certainly achieved, or a reconfiguration decision solution needs to be further adjusted according to actual configuration effects. This will influence stability of the secondary systems.

SUMMARY

The present document provides a method and a device for configuring cognitive radio system spectrum resources and solves the problem that the existing resource configuration mode influences system stability.

A method for configuring cognitive radio system spectrum resources, comprises:

receiving, by a reconfiguration management node, idle spectrum resource request information transmitted by secondary user equipment, wherein the idle spectrum resource request information indicates a demand of the secondary user equipment for idle spectrum resources; and performing, by the reconfiguration management node, an idle spectrum resource configuration decision for the secondary user equipment according to current idle spectrum resource information and historical configuration information of the idle spectrum resources of the secondary user equipment.

Preferably, the idle spectrum resource request information comprises any one or more of the following: idle spectrum request indication information, idle spectrum request cause information and idle spectrum configuration target information.

Preferably, the idle spectrum request indication information comprises any one or more of the following:

secondary user equipment location, equipment type, equipment parameter, demand for idle spectrum frequency point, demand for idle spectrum bandwidth, demand for idle spectrum idle duration, and demand for idle spectrum transmitting power, wherein the equipment parameter comprises one or more of the following: transmitter transmitting template, Adjacent Channel Leakage Ratio (ACLR), transmitting gain, antenna height, antenna direction angle, pitch angle, downward inclination angle, and polarization mode.

Preferably, the idle spectrum request cause information indicates a cause of triggering the secondary user equipment to make an idle spectrum request and comprises any one or more of the following: network overload, coverage range not as expected, cross-boundary coverage, communication interference higher than a preset threshold, service signal receiving power lower than a preset threshold, SINR lower than a preset threshold, and network performance parameter not meeting requirement.

Preferably, the network performance parameter not meeting requirement comprises any one or more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold, and handover success rate lower than a preset threshold.

Preferably, the idle spectrum configuration target information indicates a performance index that is expected by the secondary user equipment and is to be reached by a network after the secondary user equipment configures idle spectrum and comprises any one or more of the following: spectrum resource satisfying a network load demand, coverage satisfying a demand, communication link interference lower than a preset threshold, service signal receiving power satisfying a minimum receiving threshold, SINR higher than a preset threshold and network performance parameter meeting requirement.

Preferably, the current idle spectrum resource information indicates interference information on the idle spectrums and primary system idle spectrum information at a location of the current secondary user equipment.

Preferably, the method further comprises: acquiring, by the reconfiguration management node, the historical configuration information of the idle spectrum resources of the secondary user equipment, the historical configuration information of the idle spectrum resources refers to network performance information reached by using the idle spectrum resources and historical usage information of primary system idle spectrum resources for the secondary user equipment.

Preferably, the method further comprises:
acquiring the historical configuration information of the idle spectrum resources through measurement by the secondary user equipment itself or performance statistics of a network management system of a secondary system to which the secondary user equipment belongs after the secondary user equipment completes idle spectrum resource configuration, and transmitting, by the secondary user equipment or the network management system, the historical configuration information of the idle spectrum resources to the reconfiguration management node;

the historical configuration information of the idle spectrum resources comprises any one or more of the following:
frequency point for configuring idle spectrum, bandwidth for configuring idle spectrum, location of the secondary user equipment, identification of the secondary user equipment, transmitting power of the secondary user equipment, antenna parameter of resource user equipment, usage duration, SINR on idle spectrum, service signal receiving power, interference power, and network performance information after the secondary user equipment configures the idle spectrum;

the network performance information comprises any one or more of the following: throughput, transmission rate, bit error rate, block error rate, coverage rate, RRC connection establishment success rate, E-RAB establishment success rate, E-RAB establishment blocking rate, call drop rate and handover success rate, of an idle spectrum cell.

Preferably, performing, by the reconfiguration management node, an idle spectrum resource configuration decision for the secondary user equipment according to current idle spectrum resource information and historical configuration information of the idle spectrum resources of the secondary user equipment comprises:

acquiring the primary system idle spectrum information from a database for saving primary system spectrum resource usage information or from a measurement report of the secondary user equipment;

converting idle spectrum request cause information and/or idle spectrum configuration target information into a performance demand of the secondary user equipment for idle spectrum; and selecting an idle spectrum resource satisfying the performance demand from an idle spectrum list for the secondary user equipment according to performance that can be reached for the secondary user equipment in historical configuration of the idle spectrum resources, or performing priority ranking for idle spectrum resources according to performance that can be reached in historical configuration from high to low, and selecting an idle spectrum resource for the secondary user equipment.

Preferably, after performing, by the reconfiguration management node, an idle spectrum resource configuration decision for the secondary user equipment according to current idle spectrum resource information and historical configuration information of the idle spectrum resources of the secondary user equipment, the method further comprises:

transmitting, by the reconfiguration management node, a result of the idle spectrum resource configuration decision performed for the secondary user equipment to the secondary user equipment, wherein the result of the idle spectrum resource configuration decision comprises any one or more of the following: configured frequency point, configured bandwidth, configuration time and maximum allowable transmitting power.

The present document further provides a device for configuring cognitive radio system spectrum resources, comprising:

a request receiving module configured to receive idle spectrum resource request information transmitted by secondary user equipment, wherein the idle spectrum resource request information indicates a demand of the secondary user equipment for idle spectrum resources; and a configuration decision module configured to perform an idle spectrum resource configuration decision for the secondary user equipment according to current idle spectrum resource information and historical configuration information of the idle spectrum resources of the secondary user equipment.

Preferably, the device further comprises:
a historical information acquisition module configured to acquire the historical configuration information of the idle spectrum resources of the secondary user equipment, wherein the historical configuration information of the idle spectrum resources refers to network performance information reached by using the idle spectrum resources and historical usage information of primary system idle spectrum resources for the secondary user equipment.

Preferably, the configuration decision module comprises:

a primary system idle spectrum information acquisition unit configured to acquire the primary system idle spectrum information from a database for saving primary system spectrum resource usage information or from a measurement report of the secondary user equipment;

a demand conversion unit configured to convert idle spectrum request cause information and/or idle spectrum configuration target information into a performance demand of the secondary user equipment for idle spectrum; and a resource selection unit configured to select an idle spectrum resource satisfying the performance demand from an idle spectrum list for the secondary user equipment according to performance that can be reached for the secondary user equipment in historical configuration of the idle spectrum resources, or perform priority ranking for idle spectrum resources according to performance that can be reached in historical configuration from high to low, and select an idle spectrum resource for the secondary user equipment.

Preferably, the device further comprises: a configuration decision transmitting module configured to transmit a result of the idle spectrum resource configuration decision performed for the secondary user equipment to the secondary user equipment, wherein the result of the idle spectrum resource configuration decision comprises any one or more of the following: configured frequency point, configured bandwidth, configuration time and maximum allowable transmitting power.

The embodiments of the present document provide a method and a device for configuring cognitive radio system spectrum resources, a reconfiguration management node receives idle spectrum resource request information transmitted by secondary user equipment, the idle spectrum resource request information indicates a demand of the secondary user equipment for idle spectrum resources; and the reconfiguration management node performs an idle spectrum resource configuration decision for the secondary user equipment according to current idle spectrum resource information and historical configuration information of the idle spectrum resources of the secondary user equipment. Higher-efficiency idle spectrum resource configuration decision based on historical data is realized, and the problem that the existing resource configuration mode influences system stability is solved.

PREFERRED EMBODIMENTS

In the related art, a decision needs to be performed again at each time of spectrum resource reconfiguration, existing empirical data of spectrum resource reconfiguration are not used, acquisition and processing of related information are involved in a spectrum resource reconfiguration process at each time, a series of operations such as calculation of configuration parameters are needed, consequently the system costs a greater processing overhead, the configuration delay and the overhead for interaction of related signaling. In addition, since the made reconfiguration decision is not verified by actual configuration, the configuration target of the secondary user is not certainly achieved, or a reconfiguration decision solution needs to be further corrected according to actual configuration effects. This causes influences on stability of secondary systems.

In order to solve the problem, the embodiment of the present document provides a method and a device for configuring cognitive radio system spectrum resources. The embodiments of the present document will be described below in detail in combination with the drawings. It needs to be stated that the embodiments in the present application and the features in the embodiments can be freely combined under the situation of no conflict.

Figure 1:
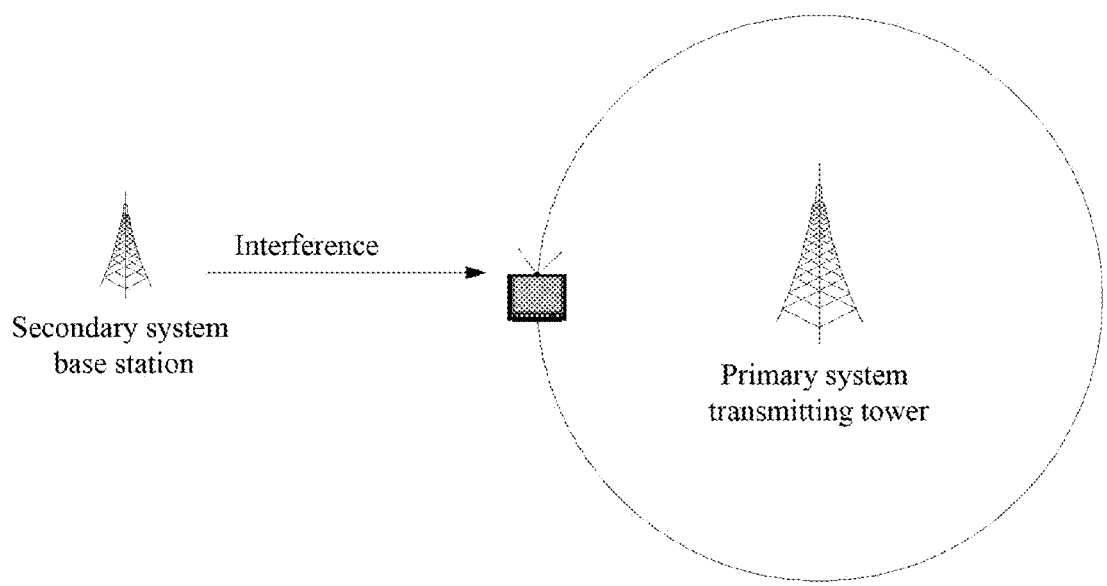
FIG. 1 is a schematic diagram of primary system interference protection.
Figure 2:
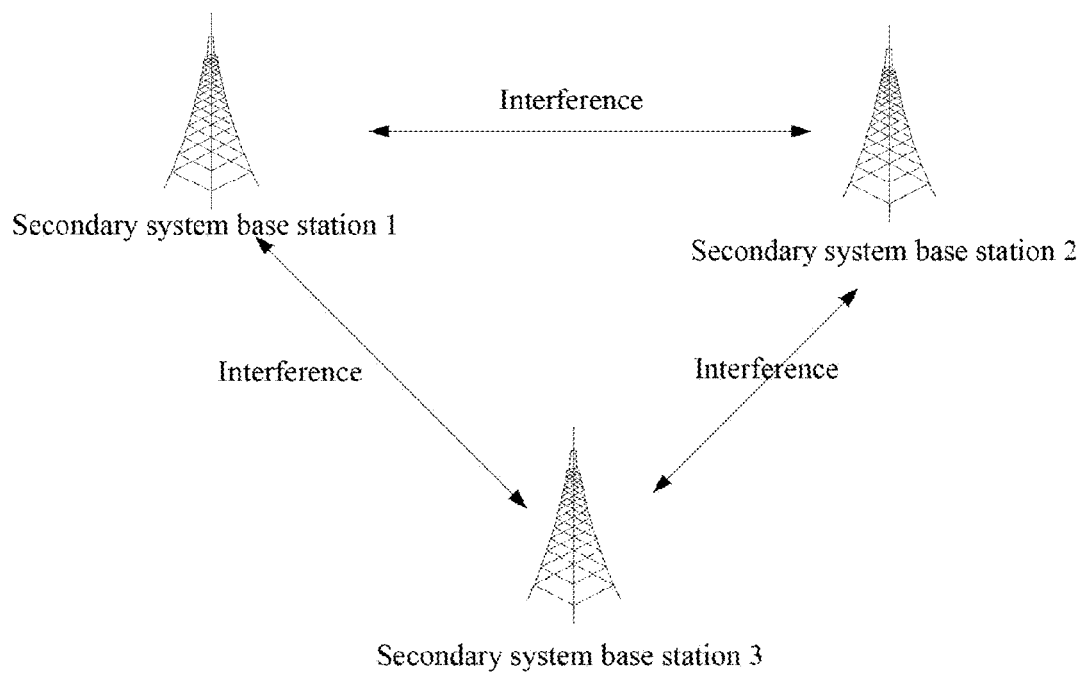
FIG. 2 is a schematic diagram of interference coexistence among secondary systems.
Figure 3:
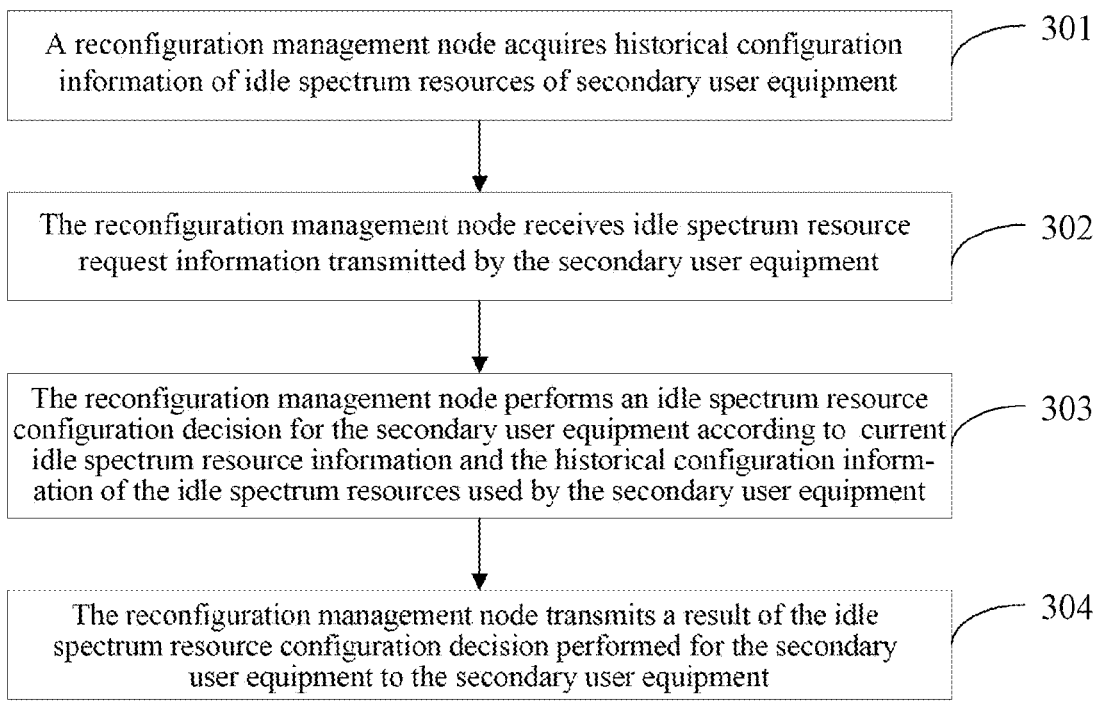
FIG. 3 is a flowchart of a method for configuring cognitive radio system spectrum resources provided by the embodiments of the present document.

The technical solution provided by the embodiment of the present document is as shown in FIG. 3. The method comprises:

In step 301, a reconfiguration management node acquires historical configuration information of idle spectrum resources of the secondary user equipment, the historical configuration information of the idle spectrum resources refers to network performance information reached by using the idle spectrum resources and historical usage information of primary system idle spectrum resources for the secondary user equipment.

Specifically, the historical configuration information of the idle spectrum resources is acquired through measurement by the secondary user equipment itself or performance statistics of a network management system of a secondary system to which the secondary user equipment belongs after the secondary user equipment completes idle spectrum resource configuration, and the historical configuration information of the idle spectrum resources is transmitted by the secondary user equipment or the network management system to the reconfiguration management node;

the historical configuration information of the idle spectrum resources comprises any one or more of the following:

frequency point for configuring idle spectrum, bandwidth for configuring idle spectrum, a location of secondary user equipment, an identification of secondary user equipment, transmitting power of secondary user equipment, antenna parameter of resource user equipment, usage duration, SINR on idle spectrums, service signal receiving power, interference power, and network performance information after the secondary user equipment configures the idle spectrum;

the network performance information comprises any one or more of the following: throughput, transmission rate, bit error rate, block error rate, coverage rate, RRC connection establishment success rate, E-RAB establishment success rate, E-RAB establishment blocking rate, call drop rate and handover success rate, of an idle spectrum cell.

In step 302, the reconfiguration management node receives idle spectrum resource request information transmitted by the secondary user equipment, the idle spectrum resource request information indicates a demand of the secondary user equipment for idle spectrum resources.

The idle spectrum resource request information comprises any one or more of the following:

idle spectrum request indication information, idle spectrum request cause information and idle spectrum configuration target information.

The idle spectrum request indication information comprises any one or more of the following: secondary user equipment location, equipment type, equipment parameter, demand for idle spectrum frequency point, demand for idle spectrum bandwidth, demand for idle spectrum idle duration, and demand for idle spectrum transmitting power, wherein the equipment parameter comprises one or more of the following: transmitter transmitting template, Adjacent Channel Leakage Ratio (ACLR), transmitting gain, antenna height, antenna direction angle, pitch angle, downward inclination angle, and polarization mode.

The idle spectrum request cause information indicates a cause of triggering the secondary user equipment to make an idle spectrum request and comprises any one or more of the following: network overload, coverage range not as expected, cross-boundary coverage, communication interference higher than a preset threshold, service signal receiving power lower than a preset threshold, SINR lower than a preset threshold and network performance parameter not meeting requirement.

The network performance parameter not meeting requirement comprises any one or more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold, and handover success rate lower than a preset threshold.

The idle spectrum configuration target information indicates a performance index that is expected by the secondary user equipment and is to be reached by a network after the secondary user equipment configures idle spectrum and comprises any one or more of the following: spectrum resource satisfying a network load demand, coverage satisfying a demand, communication link interference lower than a preset threshold, service signal receiving power satisfying the minimum receiving threshold, SINR higher than a preset threshold, and network performance parameter meeting requirement.

In step 303, the reconfiguration management node performs an idle spectrum resource configuration decision for the secondary user equipment according to current idle spectrum resource information and the historical configuration information of the idle spectrum resources of the secondary user equipment.

The current idle spectrum resource information indicates interference information on the idle spectrums and primary system idle spectrum information at a location of the current secondary user equipment.

This step specifically comprises:

the primary system idle spectrum information is acquired from a database for saving a primary system spectrum resource usage information or from a measurement report of the secondary user equipment;

idle spectrum request cause information and/or idle spectrum configuration target information is converted into a performance demand of the secondary user equipment for idle spectrum; and an idle spectrum resource satisfying the performance demand is selected from an idle spectrum list for the secondary user equipment according to performance that can be reached for the secondary user equipment in historical configuration of the idle spectrum resources, or priority ranking is performed for idle spectrum resources according to performance that can be reached in historical configuration from high to low, and an idle spectrum resource is selected for the secondary user equipment.

In step 304, the reconfiguration management node transmits a result of the idle spectrum resource configuration decision performed for the secondary user equipment to the secondary user equipment, and the result of the idle spectrum resource configuration decision comprises any one or more of the following:

configured frequency point, configured bandwidth, configuration time and maximum allowable transmitting power.

Herein, the involved reconfiguration management node refers to a function entity which is responsible for spectrum resource reconfiguration management of the secondary system, which may be any one of the following function entities: Spectrum Controller (SC), Central Control Point (CCP), reconfiguration management module, reconfiguration function module, reconfiguration entity, advanced positioning entity, advanced positioning function and coexistence function.

Figure 4:
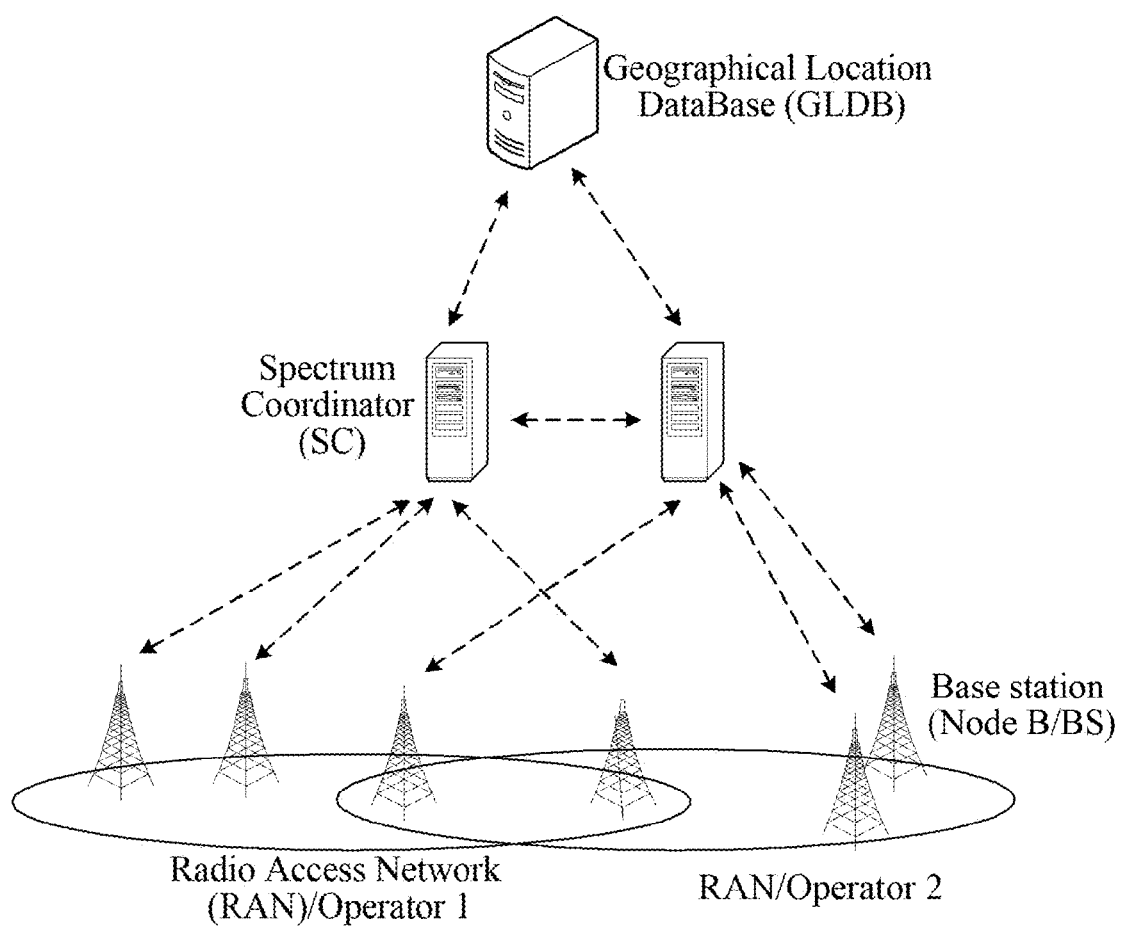
FIG. 4 is a schematic diagram of system architecture of a TVWS frequency band CR technology.

Typical primary system idle spectrum resources are, for example, TVWS spectrums, i.e., spectrum resources unused by primary systems within a range of 470-790 MHz. In the present document, description is made by taking the TVWS spectrums as an example. A GLDB is taken as an example of a primary user protection management node, and an SC is taken as an example of a reconfiguration management node for interference coexistence among secondary systems. Architecture of the TVWS frequency band CR technology is as shown in FIG. 4 and is introduced as follows.

The GLDB is responsible for protecting primary systems, providing a primary system spectrum usage information for secondary user equipment or a secondary system management node and preventing the primary systems from interference of secondary systems. Specifically, the GLDB provides idle spectrum resources at a location of the secondary user equipment and calculates allowed maximum transmitting power of the secondary user equipment according to a primary user protection criterion.

The SC is a spectrum resource reconfiguration management node of a secondary system and is responsible for coexistence management, priority management and measurement management among secondary user equipment.

The BS is secondary user equipment and may represent a base station in a cellular network system such as an LTE, 3G or 2G system or the like, or an Access Point (AP) in an IEEE802 system such as WLAN, WRAN or Wimax system or the like.

Embodiment 1

Figure 5:
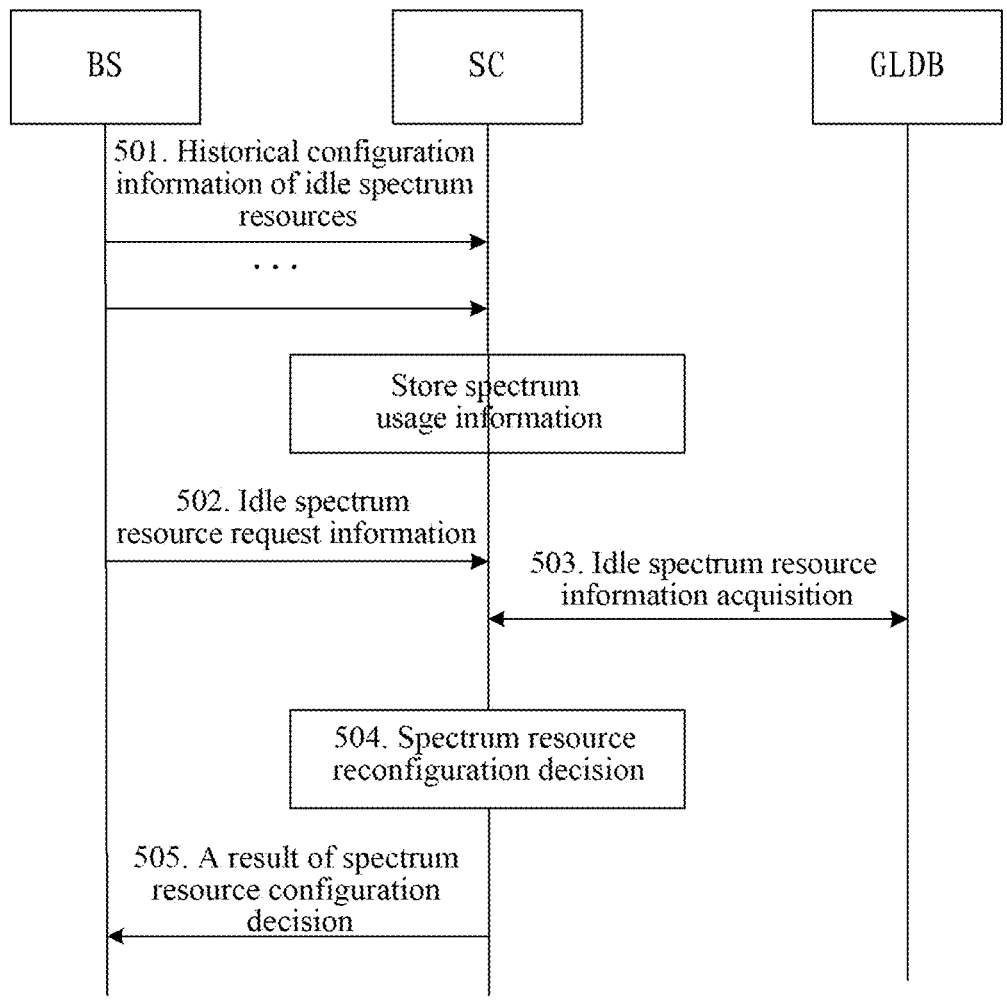
FIG. 5 is a flowchart of a method for configuring cognitive radio system spectrum resources provided by embodiments 1 and 2 of the present document.

The embodiment of the present document provides a method for configuring cognitive radio system spectrum resources, which is described by taking an SC as an example of a reconfiguration management node. The SC performs a spectrum resource reconfiguration decision for the secondary user equipment according to BS idle spectrum reconfiguration target information, usage information of primary system spectrums and historical configuration information of primary system idle spectrum resources for the secondary user equipment, the flow is as shown in FIG. 5, and specific description is made below:

In step 501, an SC acquires and stores historical configuration information of idle spectrum resources reported by a BS.

The historical configuration information of the idle spectrum resources refers to configuration information when primary system idle spectrum resources were ever used by the BS; and comprises one or more of the following: frequency point for configuring idle spectrum, bandwidth for configuring idle spectrum, location of secondary user equipment, identification of secondary user equipment, transmitting power of secondary user equipment, antenna parameter of resource user equipment, usage duration, SINR on idle spectrum, service signal receiving power, interference power, and network performance information after the secondary user equipment configures the idle spectrum.

The network performance information after the secondary user equipment configures the idle spectrum refers to communication performance parameters of an idle spectrum cell established by a secondary user/system by using the primary system idle spectrum resources; and comprises, but not limited to, one or more of the following: throughput, transmission rate, bit error rate, block error rate, coverage rate, RRC connection establishment success rate, E-RAB establishment success rate, E-RAB establishment blocking rate, call drop rate and handover success rate, of the idle spectrum cell.

In this embodiment, the historical configuration information at frequency bands 530 MHz, 560 MHz and 480 MHz reported by the BS is as shown in Table 1:

TABLE 1

| Site | Location | ID | Frequency point MHz | Bandwidth MHz | Transmitting power | Bit error rate | Transmission rate | Handover success rate |
|---|---|---|---|---|---|---|---|---|
| | | | | | | | Performance information | |
| BS | L 1 | 01 | f1 = 530 | 8 | 40 dBm | 5% | 60 Mbit/s | 99% |
| BS | L 1 | 01 | f2 = 560 | 8 | 30 dBm | 2% | 80 Mbit/s | 99% |
| BS | L 1 | 01 | f3 = 480 | 8 | 40 dBm | 1% | 40 Mbit/s | 99% |

In step 502, the BS initiates an idle spectrum request, and reports an idle spectrum reconfiguration target.

In this step, the BS transmits idle spectrum resource request information to the SC, wherein the idle spectrum resource request information comprises any one or more of the following: idle spectrum request indication information, idle spectrum request cause information and idle spectrum configuration target information.

The idle spectrum request indication information comprises any one of more of the following: secondary user equipment location, equipment type, equipment parameter, demand for idle spectrum frequency point, demand for idle spectrum bandwidth, demand for idle spectrum idle duration and demand for idle spectrum transmitting power, wherein the equipment parameters comprises one of more of the following: transmitter transmitting template, Adjacent Channel Leakage Ratio (ACLR), transmitting gain, antenna height, antenna direction angle, pitch angle, downward inclination angle and polarization mode.

The idle spectrum request cause information indicates a cause of triggering the secondary user equipment to make an idle spectrum request and comprises any one of more of the following: network overload, coverage range not as expected, cross-boundary coverage, communication interference higher than a preset threshold, service signal receiving power lower than a preset threshold, SINR lower than a preset threshold and network performance parameter not meeting requirement.

The network performance parameter not meeting requirement comprises any one or more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold and handover success rate lower than a preset threshold.

The idle spectrum configuration target information indicates a performance index that is expected by the secondary user equipment and is to be reached by a network after the secondary user equipment configures the idle spectrum and comprises any one of more of the following: spectrum resource satisfying a network load demand, coverage satisfying a demand, communication link interference lower than a preset threshold, service signal receiving power satisfying the minimum receiving threshold, SINR higher than a preset threshold, and network performance parameter meeting requirement.

In other words, the BS transmits idle spectrum resource request information to the SC, comprising location L1, identification 01 and equipment parameters including technology identification (LTE), equipment type (fixed equipment), transmitting level (transmitting power level), antenna parameters (height, antenna direction angle, pitch angle and radio polarizability), transmitting template (ACLR), etc.; and the idle spectrum reconfiguration target comprises bit error rate lower than 3%, transmission rate higher than 50 Mbit/s and handover success rate higher than 95%.

The antenna parameters reported by the BS are used when the GLDB calculates the maximum allowable transmitting power for the BS according to primary user protection demands and when the SC calculates the transmitting power satisfying BS coexistence for the BS according to a BS coexistence criterion.

In step 503, the SC accesses the GLDB to acquire primary system idle spectrum resource information at a location of the BS at this moment according to the idle spectrum resource request message.

In this step, the primary system idle spectrum resource information is current idle spectrum resource information, and a specific access process is that the SC transmits location information of the BS and antenna parameter information to the GLDB, the GLDB searches primary user spectrum resource usage information stored at this location and finds f1, f2, f3 and f4=710 MHz four bands of available spectrum resources, and the maximum allowable transmitting powers on the spectrum resources are calculated respectively as 40 dBm, 30 dBm, 40 dBm and 30 dBm according to the antenna parameters of the BS and the protection criterion of each primary user. The GLDB feeds the above-mentioned information back to the SC. An idle spectrum resource list is as follow:

TABLE 2

| Location | Frequency MHz | Bandwidth MHz | Maximum allowable transmitting power |
|---|---|---|---|
| L1 | f1 = 530 | 8 | 40 dBm |
| L1 | f2 = 560 | 8 | 30 dBm |
| L1 | f3 = 480 | 8 | 40 dBm |
| L1 | f4 = 710 | 8 | 30 dBm |

In step 504, the SC performs an idle spectrum resource configuration decision.

According to the acquired idle spectrum resource list (Table 2) (i.e., current idle spectrum resource information, herein the current idle spectrum resource information indicates interference information on the idle spectrum and primary system idle spectrum information at the current location of the secondary user equipment) and the existing BS historical configuration information (Table 1), it is determined that the performance demand can be satisfied when the BS uses f2=560 MHz; and thus it is decided that the configuration spectrum is f2=560 MHz, bandwidth is 8 MHz and the maximum allowable transmitting power is 30 dBm.

A result of the idle spectrum resource configuration decision forms a message which can be recognized by the BS.

In step 505, the SC transmits the result of the idle spectrum resource configuration decision to the BS.

In this embodiment, the secondary system uses bit error rate, transmission rate and handover success rate as parameters for measuring system performance, and other parameters such as throughput, block error rate, coverage rate, RRC connection establishment success rate, E-RAB establishment success rate, E-RAB establishment blocking rate and call drop rate of idle spectrum cell may also be used as performance parameters. In addition, if all performance indexes reached in the historical configuration of the idle spectrums cannot satisfy the performance demand of the secondary system, the configuration with the optimum performance is selected for the BS; or all idle spectrum resource information is provided to the BS and the BS selects the idle spectrum; or spectrum configuration for the BS is abandoned.

Embodiment 2

The embodiment of the present document provides a method for configuring cognitive radio system spectrum resources, which is described by taking an SC as an example of a reconfiguration management node. Another embodiment flow for the SC to perform a spectrum resource reconfiguration decision for secondary user equipment according to usage information of primary system spectrums and historical configuration information of primary system idle spectrum resources for the secondary user equipment is as shown in FIG. 5, and specific description is made below:

In step 501, specific implementation is the same as specific implementation of step 501 in method embodiment 1 and is not repetitively described here.

In step s502, the BS initiates an idle spectrum request, and reports an idle spectrum reconfiguration target.

In this step, the BS transmits idle spectrum resource request information to the SC, wherein the idle spectrum resource request information comprises any one of more of the following: idle spectrum request indication information, idle spectrum request cause information and idle spectrum configuration target information.

The idle spectrum request indication information comprises any one of more of the following: secondary user equipment location, equipment type, equipment parameter, demand for idle spectrum frequency point, demand for idle spectrum bandwidth, demand for idle spectrum idle duration and demand for idle spectrum transmitting power, wherein the equipment parameter comprises one of more of the following: transmitter transmitting template, Adjacent Channel Leakage Ratio (ACLR), transmitting gain, antenna height, antenna direction angle, pitch angle, downward inclination angle and polarization mode.

The idle spectrum request cause information indicates a cause of triggering the secondary user equipment to make an idle spectrum request and comprises any one of more of the following: network overload, coverage range not as expected, cross-boundary coverage, communication interference higher than a preset threshold, service signal receiving power lower than a preset threshold, SINR lower than a preset threshold and network performance parameter not meeting requirement.

The network performance parameter not meeting requirement comprises any one of more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold and handover success rate lower than a preset threshold.

The idle spectrum configuration target information indicates a performance index that is expected by the secondary user equipment and is to be reached by a network after configuring the idle spectrum and comprises any one of more of the following: spectrum resource satisfying network load demand, coverage satisfying demand, communication link interference lower than a preset threshold, service signal receiving power satisfying the minimum receiving threshold, SINR higher than a preset threshold and network performance parameter meeting requirement.

In other words, the BS transmits idle spectrum reconfiguration request information and idle spectrum reconfiguration target information to the SC, including location L1, identification 01 and antenna parameters; and the antenna parameters here are used when the GLDB calculates the maximum allowable transmitting power for the BS according to primary user protection requirements and when the SC calculates the transmitting power satisfying BS coexistence for the BS according to BS coexistence criterion. The idle spectrum reconfiguration target is: bit error rate lower than 3%, transmission rate higher than 50 Mbit/s and handover success rate higher than 95%.

In step 503, specific implementation is the same as specific implementation of step 501 in method embodiment 1 and is not repetitively described here.

In step 504, the SC performs an idle spectrum resource configuration decision.

According to the acquired idle spectrum resource list (Table 2) and the existing BS historical configuration information (Table 1), the idle spectrum with optimum performance is selected for the BS as the configuration spectrum of the BS; according to BS historical configuration information, it can be known that the maximum transmission rate can be obtained when the BS is configured at f2=560 MHz; and the minimum bit error rate can be obtained when the BS is configured at f3=480 MHz. According to system configuration such as that the system defines the minimum bit error rate as a criterion, the SC can select f3=480 MHz as the configuration spectrum for the BS, the bandwidth is 8 MHz and the maximum allowable transmitting power is 40 dBm.

A result of the idle spectrum resource configuration decision forms a message which can be recognized by the BS.

In step 505, the SC transmits a result of the idle spectrum resource configuration decision to the BS.

In step 504 of this embodiment of the present document, the SC can also not select the spectrum for the BS, i.e., all idle spectrums and performances estimated to be reached are transmitted to the BS and the BS selects the configuration spectrum.

Embodiment 3

Figure 6:
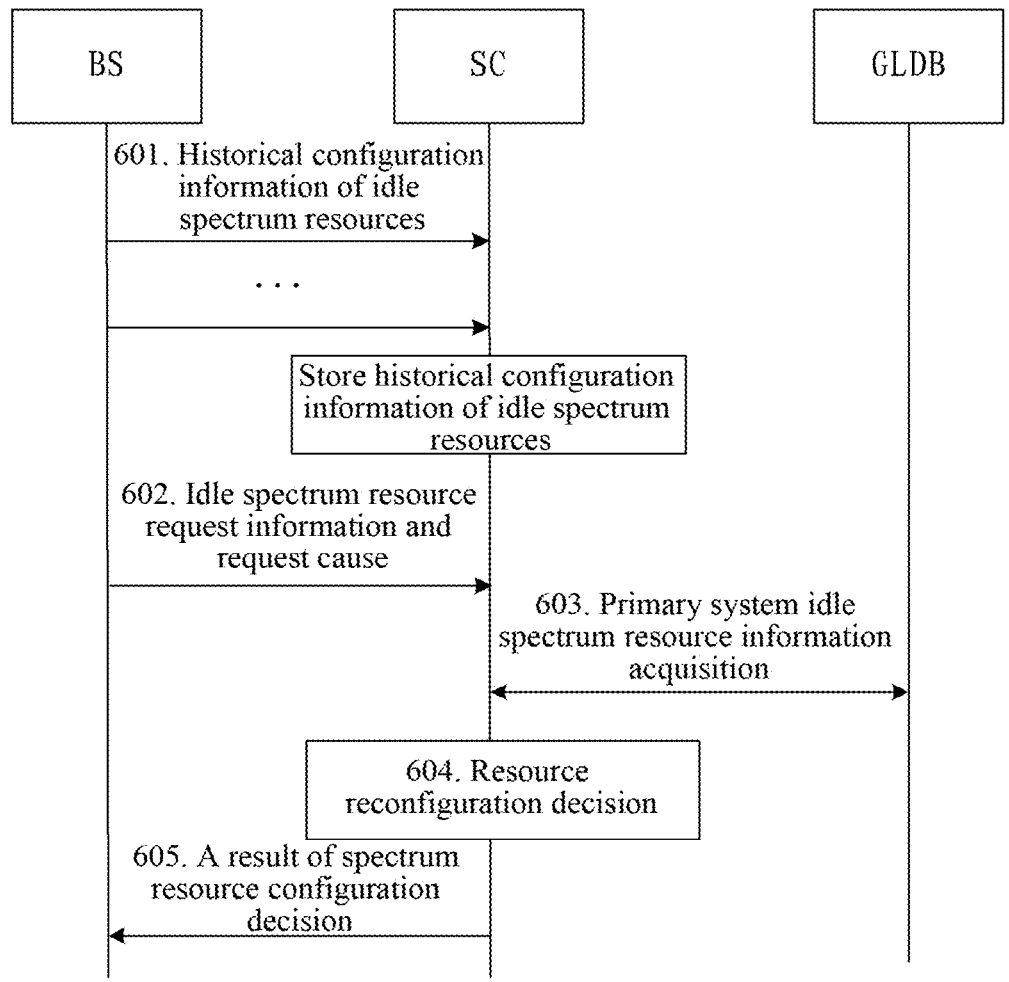
FIG. 6 is a flowchart of a method for configuring cognitive radio system spectrum resources provided by embodiments 3 and 4 of the present document.

The embodiment of the present document provides a method for configuring cognitive radio system spectrum resources, which is described by taking an SC as an example of a reconfiguration management node. An embodiment flow for the SC to perform spectrum resource reconfiguration decision for a BS based on idle spectrum reconfiguration request cause information (interference exceeding a preset threshold) is as shown in FIG. 6, and specific description is made below:

In step 601, an SC acquires and stores historical configuration information of idle spectrum resources reported by a BS.

The historical configuration information of the idle spectrum resources refers to configuration information when primary system idle spectrum resources were ever used by the BS; and comprises one of more of the following: frequency point for configuring idle spectrum, bandwidth for configuring idle spectrum, location of secondary user equipment, identification of secondary user equipment, transmitting power of secondary user equipment, antenna parameter of resource user equipment, usage duration, SINK on idle spectrum, service signal receiving power, interference power, and network performance information after the secondary user equipment configures the idle spectrum.

The network performance information after the secondary user equipment configures the idle spectrum refers to communication performance parameters of an idle spectrum cell established by a secondary user/system by using the primary system idle spectrum resources; and comprises, but not limited to, one of more of the following: throughput, transmission rate, bit error rate, block error rate, coverage rate, RRC connection establishment success rate, E-RAB establishment success rate, E-RAB establishment blocking rate, call drop rate and handover success rate, of the idle spectrum cell.

In this embodiment, the historical configuration information at frequency bands 530 MHz, 560 MHz and 480 MHz reported by the BS is as shown in Table 3:

TABLE 3

| Site | Location | ID | Frequency point MHz | Bandwidth MHz | Transmitting power | Covered edge interference value |
|---|---|---|---|---|---|---|
| BS | L 1 | 01 | f1 = 530 | 8 | 40 dBm | −20 dBm |
| BS | L 1 | 01 | f2 = 560 | 8 | 30 dBm | −10 dBm |
| BS | L 1 | 01 | f3 = 480 | 8 | 40 dBm | −30 dBm |

In step 602, the BS initiates an idle spectrum request, and reports an idle spectrum reconfiguration request cause.

In this step, the BS transmits idle spectrum resource request information to the SC, wherein the idle spectrum resource request information comprises any one of more of the following: idle spectrum request indication information, idle spectrum request cause information and idle spectrum configuration target information.

The idle spectrum request indication information comprises any one of more of the following: secondary user equipment location, equipment type, equipment parameter, demand for idle spectrum frequency point, demand for idle spectrum bandwidth, demand for idle spectrum idle duration and demand for idle spectrum transmitting power, wherein the equipment parameters comprises one of more of the following: transmitter transmitting template, Adjacent Channel Leakage Ratio (ACLR), transmitting gain, antenna height, antenna direction angle, pitch angle, downward inclination angle and polarization mode.

The idle spectrum request cause information indicates a cause of triggering the secondary user equipment to make an idle spectrum request and comprises any one or more of the following: network overload, coverage range not as expected, cross-boundary coverage, communication interference higher than a preset threshold, service signal receiving power lower than a preset threshold, SINR lower than a preset threshold and network performance parameter not meeting requirements.

The network performance parameter not meeting requirements comprises any one of more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold and handover success rate lower than a preset threshold.

The idle spectrum configuration target information indicates a performance index that is expected by the secondary user equipment and is to be reached by a network after configuring idle spectrum and comprises any one of more of the following: spectrum resource satisfying a network load demand, coverage satisfying a demand, communication link interference lower than a preset threshold, service signal receiving power satisfying the minimum receiving threshold, SINR higher than a preset threshold and network performance parameter meeting requirement.

In other words, the BS transmits idle spectrum resource request information to the SC, including location L1, identification 01 and equipment parameters including technology identification (LTE), equipment type (fixed equipment), transmitting level (transmitting power level), antenna parameters (height, antenna direction angle, pitch angle and radio polarizability), transmitting template (ACLR), etc.; and the antenna parameters reported by the BS are used when the GLDB calculates the maximum allowable transmitting power for the BS according to primary user protection requirements and when the SC calculates the transmitting power satisfying BS coexistence for the BS according to a BS coexistence criterion.

The idle spectrum reconfiguration request cause is communication link interference higher than a preset threshold Imax, wherein the threshold is set according to interference tolerance of the secondary system, and the system cannot satisfy the performance requirement if an actual interference value is higher than the threshold. In this embodiment, Imax is −20 dBm.

The situation that the interference on communication links is higher than the preset threshold can be observed by monitoring the network performance of the secondary user equipment. If one of the following situations is found by the network through performance monitoring: transmission rate lower than a preset threshold, bit error rate, block error rate and call drop rate higher than a preset threshold, RRC connection establishment success rate and E-RAB establishment success rate lower than a threshold, E-RAB establishment blocking rate higher than a preset threshold and handover success rate lower than a preset threshold, a cause is further judged, it is determined that the interference value on the communication links is higher than Imax and thus the idle spectrum reconfiguration request is triggered.

In step 603, the SC accesses the GLDB to acquire primary system idle spectrum resource information at a location of the BS at this moment according to the idle spectrum resource request information.

In this step, the primary system idle spectrum resource information is current idle spectrum resource information, and a specific access process is that the SC transmits location information of the BS and antenna parameter information to the GLDB, the GLDB searches primary user spectrum resource usage information stored at this location and finds f1, f2, f3 and f4=710 MHz four bands of available spectrum resources, and the maximum allowable transmitting powers on the spectrum resources are calculated respectively as 40 dBm, 30 dBm, 40 dBm and 30 dBm according to the antenna parameters of the BS and the protection criterion of each primary user. The GLDB feeds the above-mentioned information back to the SC. An idle spectrum resource list is as follow:

TABLE 4

| Location | Frequency MHz | Bandwidth MHz | Maximum allowable transmitting power |
| --- | --- | --- | --- |
| L1 | f1 = 530 | 8 | 40 dBm |
| L1 | f2 = 560 | 8 | 30 dBm |
| L1 | f3 = 480 | 8 | 40 dBm |
| L1 | f4 = 710 | 8 | 30 dBm |

In step 604, the SC performs an idle spectrum resource configuration decision.

According to the acquired idle spectrum resource list (Table 4) and the existing BS historical configuration information (Table 3), it is determined that interference values of edge users are −20 dBm and −10 dBm and the requirement on maximum interference tolerance cannot be satisfied when the BS uses f1 and f2, and the interference value of the edge users is −30 dBm according to Table 3 and the performance demand can be satisfied when the BS uses f3=480 MHz; and thus it is decided that the configuration spectrum is f3=480 MHz, the bandwidth is 8 MHz and the maximum allowable transmitting power is 40 dBm.

A result of the idle spectrum resource configuration decision forms a message which can be recognized by the BS.

In step 605, the SC transmits the result of the idle spectrum resource configuration decision to the BS.

In this embodiment, the secondary system uses the interference value higher than a preset threshold as the idle spectrum reconfiguration request cause to trigger the spectrum resource reconfiguration decision process at this time. Other causes such as network overload, coverage range not as expected, cross-boundary coverage, cell edge user service signal power lower than a preset threshold and cell average SINR lower than a preset threshold may also be used as the reconfiguration request cause.

In addition, if all performance indexes reached in the historical configuration of the idle spectrums cannot satisfy the performance demand of the secondary system, the configuration with the optimum performance is selected for the BS; or all idle spectrum resource information is provided to the BS and the BS selects the idle spectrum; or spectrum configuration for the BS is abandoned.

Embodiment 4

The embodiment of the present document provides a method for configuring cognitive radio system spectrum resources, which is described by taking an SC as an example of a reconfiguration management node. An embodiment flow for the SC to perform a spectrum resource reconfiguration decision for a BS1 based on idle spectrum reconfiguration request cause information (average SINR of cell edge users lower than a preset threshold) is as shown in FIG. 6, and specific description is made below:

In step 601, an SC acquires and stores historical configuration information of idle spectrum resources reported by a BS.

The historical configuration information of the idle spectrum resources refers to configuration information when primary system idle spectrum resources were ever used by the BS; and comprises one of more of the following: frequency point for configuring idle spectrum, bandwidth for configuring idle spectrum, location of secondary user equipment, identification of secondary user equipment, transmitting power of secondary user equipment, antenna parameter of resource user equipment, usage duration, SINR on idle spectrum, service signal receiving power, interference power, and network performance information after the secondary user equipment configures the idle spectrum.

The network performance information after the secondary user equipment configures the idle spectrum refers to communication performance parameters of an idle spectrum cell established by a secondary user/system by using the primary system idle spectrum resources; and comprises, but not limited to, one of more of the following: throughput, transmission rate, bit error rate, block error rate, coverage rate, RRC connection establishment success rate, E-RAB establishment success rate, E-RAB establishment blocking rate, call drop rate and handover success rate, of the idle spectrum cell.

In this embodiment, the historical configuration information at frequency bands 530 MHz, 560 MHz and 480 MHz reported by the BS is as shown in Table 5:

TABLE 5

| Site | Location | ID | Frequency point MHz | Bandwidth MHz | Transmitting power | Average SINR |
|---|---|---|---|---|---|---|
| BS | L 1 | 01 | f1 = 530 | 8 | 40 dBm | 10 dB |
| BS | L 1 | 01 | f2 = 560 | 8 | 30 dBm | 5 dB |
| BS | L 1 | 01 | f3 = 480 | 8 | 40 dBm | −5 dB |

In step 602, the BS initiates an idle spectrum request, and reports an idle spectrum reconfiguration request cause.

In this step, the BS transmits idle spectrum resource request information to the SC, wherein the idle spectrum resource request information comprises any one or more of the following: idle spectrum request indication information, idle spectrum request cause information and idle spectrum configuration target information.

The idle spectrum request indication information comprises any one of more of the following: secondary user equipment location, equipment type, equipment parameter, demand for idle spectrum frequency point, demand for idle spectrum bandwidth, demand for idle spectrum idle duration and demand for idle spectrum transmitting power, wherein the equipment parameter comprises one of more of the following: transmitter transmitting template, Adjacent Channel Leakage Ratio (ACLR), transmitting gain, antenna height, antenna direction angle, pitch angle, downward inclination angle and polarization mode.

The idle spectrum request cause information indicates a cause of triggering the secondary user equipment to make an idle spectrum request and comprises any one of more of the following: network overload, coverage range not as expected, cross-boundary coverage, communication interference higher than a preset threshold, service signal receiving power lower than a preset threshold, SINR lower than a preset threshold and network performance parameter not meeting requirements.

The network performance parameter not meeting requirements comprises any one of more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold and handover success rate lower than a preset threshold.

The idle spectrum configuration target information indicates a performance index that is expected by the secondary user equipment and is to be reached by a network after configuring the idle spectrum and comprises any one of more of the following: spectrum resource satisfying a network load demand, coverage satisfying a demand, communication link interference lower than a preset threshold, service signal receiving power satisfying the minimum receiving threshold, SINR higher than a preset threshold and network performance parameter meeting requirement.

In other words, the BS transmits idle spectrum resource request information to the SC, including location L1, identification 01 and equipment parameters including technology identification (LTE), equipment type (fixed equipment), transmitting level (transmitting power level), antenna parameters (height, antenna direction angle, pitch angle and radio polarizability), transmitting template (ACLR), etc.; and the antenna parameters reported by the BS are used when the GLDB calculates the maximum allowable transmitting power for the BS according to primary user protection requirements and when the SC calculates the transmitting power satisfying BS coexistence for the BS according to a BS coexistence criterion.

The idle spectrum reconfiguration request cause is an average SINR of cell edge users lower than a preset threshold −7.5 dB, wherein the threshold is set according to the lowest SINR requirement of the secondary system, and the system cannot satisfy the performance requirement by any coding and modulation mode when an actual RINR value is lower than the threshold. In this embodiment, the SINR threshold is −7.5 dB.

In step 603, the SC accesses the GLDB to acquire idle spectrum resource information of a primary system at a location of the BS at this moment according to the idle spectrum resource request message.

In this step, the idle spectrum resource information of the primary system is current idle spectrum resource information, and a specific access process is that the SC transmits location information of the BS and antenna parameter information to the GLDB, the GLDB searches primary user spectrum resource usage information stored at this location and finds f1, f2 and f3 three bands of available spectrum resources, and the maximum allowable transmitting powers on the spectrum resources are calculated respectively as 40 dBm, 40 dBm and 30 dBm according to the antenna parameters of the BS and the protection criterion of each primary user. The GLDB feeds the above-mentioned information back to the SC. An idle spectrum resource list is as follow:

TABLE 6

| Location | Frequency MHz | Bandwidth MHz | Maximum allowable transmitting power |
|---|---|---|---|
| L1 | f1 = 530 | 8 | 40 dBm |
| L1 | f3 = 480 | 8 | 40 dBm |
| L1 | f4 = 710 | 8 | 30 dBm |

In step 604, the SC performs an idle spectrum resource configuration decision.

According to the acquired idle spectrum resource list (Table 6) and the existing BS historical configuration information (Table 5), the idle spectrum with the largest average SINR of the cell edge users is selected as a reconfiguration target spectrum, and thus the average SINR value of the cell edge users can reach 10 dB when the transmitting power is 40 dBm at frequency f1.

A result of the idle spectrum resource configuration decision forms a message which can be recognized by the BS.

In step 605, the SC transmits a result of the idle spectrum resource configuration decision to the BS.

In this embodiment, the secondary system uses average SINR of cell edge users lower than a preset threshold as the idle spectrum reconfiguration request cause to trigger the spectrum resource reconfiguration decision process at this time. Other causes such as network overload, coverage range not as expected, cross-boundary coverage, communication link interference higher than a preset threshold and cell edge user service signal power lower than a preset threshold may also be used as the reconfiguration request cause.

In addition, if all performance indexes reached in the historical configuration of the idle spectrums cannot satisfy the performance demand of the secondary system, the configuration with the optimum performance is selected for the BS; or all idle spectrum resource information is provided to the BS and the BS selects the idle spectrum; or spectrum configuration for the BS is abandoned.

Embodiment 5

Figure 7:
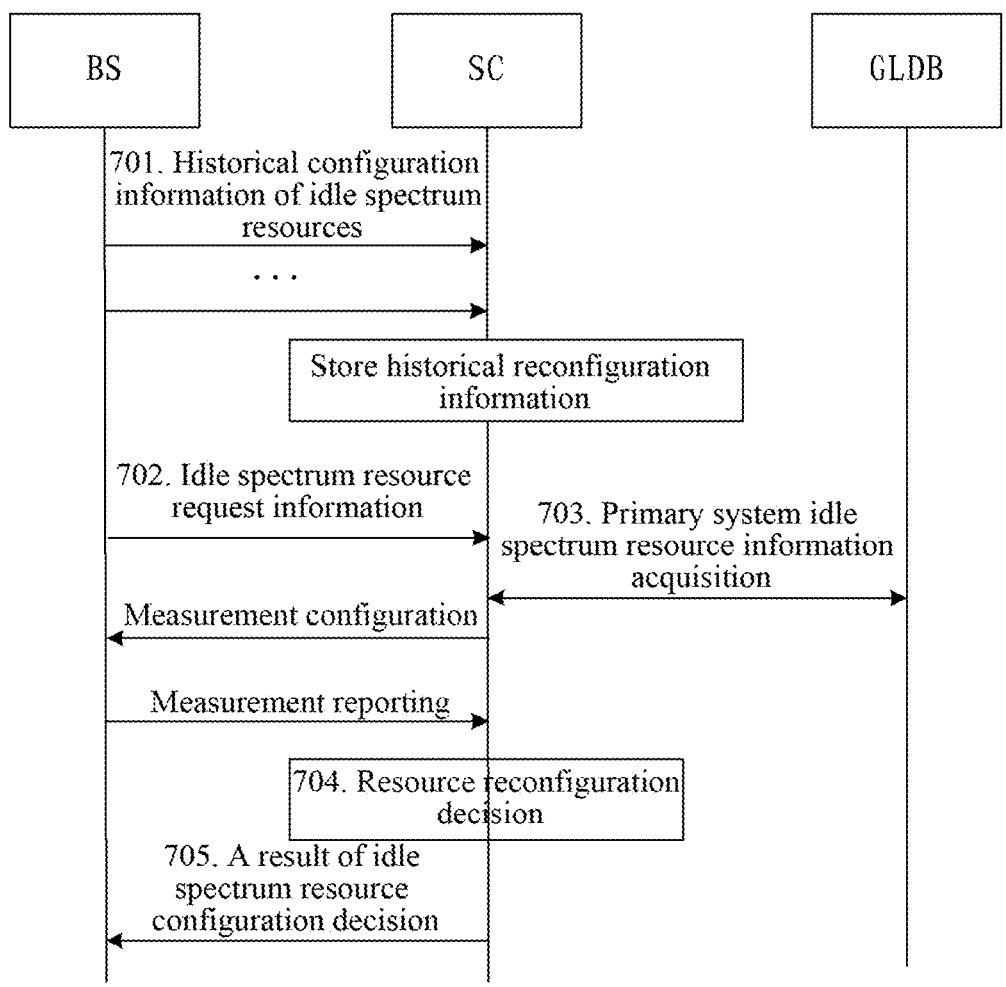
FIG. 7 is a flowchart of a method for configuring cognitive radio system spectrum resources provided by embodiment 5 of the present document.

The embodiment of the present document provides a method for configuring cognitive radio system spectrum resources, which is described by taking an SC as an example of a reconfiguration management node. An embodiment flow for the SC to perform a spectrum resource reconfiguration decision for a BS1 based on idle spectrum reconfiguration request cause information (coverage range not as expected) is as shown in FIG. 7, and specific description is made below:

In step 701, an SC acquires and stores historical configuration information of idle spectrum resources reported by a BS.

The historical configuration information of the idle spectrum resources refers to configuration information when primary system idle spectrum resources were ever used by the BS; and comprises one of more of the following: frequency point for configuring idle spectrum, bandwidth for configuring idle spectrum, location of secondary user equipment, identification of secondary user equipment, transmitting power of secondary user equipment, antenna parameter of resource user equipment, usage duration, SINR on idle spectrum, service signal receiving power, interference power, and network performance information after the secondary user equipment configures the idle spectrum.

The network performance information after the secondary user equipment configures the idle spectrum refers to communication performance parameters of an idle spectrum cell established by a secondary user/system by using the primary system idle spectrum resources; and comprises, but not limited to, one of more of the following: throughput, transmission rate, bit error rate, block error rate, coverage rate, RRC connection establishment success rate, E-RAB establishment success rate, E-RAB establishment blocking rate, call drop rate and handover success rate, of the idle spectrum cell.

In this embodiment, the historical configuration information at frequency bands 530 MHz, 560 MHz and 480 MHz reported by the BS is as shown in Table 7:

TABLE 7

| Site | Location | ID | Frequency point MHz | Bandwidth MHz | Transmitting power | Interference value | SINR |
|------|----------|----|---------------------|---------------|--------------------|--------------------|------|
| BS | L 1 | 01 | f1 = 530 | 8 | 40 dBm | −10 dBm | 5 dB |
| BS | L 1 | 01 | f2 = 560 | 8 | 40 dBm | −20 dBm | 10 dB |
| BS | L 1 | 01 | f3 = 480 | 8 | 30 dBm | −15 dBm | 0 dB |

In step 702, the BS initiates an idle spectrum request, and reports an idle spectrum reconfiguration request cause.

In this step, the BS transmits idle spectrum resource request information to the SC, wherein the idle spectrum resource request information comprises any one of more of the following: idle spectrum request indication information, idle spectrum request cause information and idle spectrum configuration target information.

The idle spectrum request indication information comprises any one of more of the following: secondary user equipment location, equipment type, equipment parameter, demand for idle spectrum frequency point, demand for idle spectrum bandwidth, demand for idle spectrum idle duration and demand for idle spectrum transmitting power, wherein the equipment parameters comprises one of more of the following: a transmitter transmitting template, Adjacent Channel Leakage Ratio (ACLR), transmitting gain, antenna height, antenna direction angle, pitch angle, downward inclination angle and polarization mode.

The idle spectrum request cause information indicates a cause of triggering the secondary user equipment to make an idle spectrum request and comprises any one of more of the following: network overload, coverage range not as expected, cross-boundary coverage, communication interference higher than a preset threshold, service signal receiving power lower than a preset threshold, SINR lower than a preset threshold and network performance parameter not meeting requirement.

The network performance parameter not meeting requirement comprises any one of more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold and handover success rate lower than a preset threshold.

The idle spectrum configuration target information indicates a performance index that is expected by the secondary user equipment and is to be reached by a network after configuring the idle spectrum and comprises any one of more of the following: spectrum resource satisfying network load demand, coverage satisfying demand, communication link interference lower than a preset threshold, service signal receiving power satisfying the minimum receiving threshold, SINR higher than a preset threshold, and network performance parameter meeting requirement.

In other words, the BS transmits idle spectrum resource request information to the SC, and the idle spectrum resource request information comprises location L1, identification 01 and equipment parameters including technology identification (LTE), equipment type (fixed equipment), transmitting level (transmitting power level), antenna parameters (height, antenna direction angle, pitch angle and radio polarizability), transmitting template (ACLR), etc.; and the antenna parameters reported by the BS are used when the GLDB calculates the maximum allowable transmitting power for the BS according to primary user protection requirements and when the SC calculates the transmitting power satisfying BS coexistence for the BS according to a BS coexistence criterion.

The idle spectrum reconfiguration request cause is coverage range not as expected, i.e., the SINR of partial edge users does not satisfy the requirement and the coverage demand is not satisfied. The average SINR of edge users in an idle spectrum f4=670 MHz cell under the BS is −10 dB and does not satisfy the service requirement.

In step 703, the SC accesses the GLDB to acquire primary system idle spectrum resource information at a location of the BS at this moment according to the idle spectrum resource request message.

In this step, the primary system idle spectrum resource information is current idle spectrum resource information, and a specific access process is that the SC transmits location information of the BS and antenna parameter information to the GLDB, the GLDB searches primary user spectrum resource usage stored at this location and finds f1, f2, f3 and f4=670 MHz four bands of available spectrum resources, and the maximum allowable transmitting powers on the spectrum resources are calculated respectively as 40 dBm, 40 dBm, 30 dBm and 30 dBm according to the antenna parameters of the BS and the protection criterion of each primary user. The GLDB feeds the above-mentioned information back to the SC. An idle spectrum resource list is as follow:

TABLE 8

| Location | Frequency MHz | Bandwidth MHz | Maximum allowable transmitting power |
|---|---|---|---|
| L1 | f1 = 530 | 8 | 40 dBm |
| L1 | f2 = 560 | 8 | 40 dBm |
| L1 | f3 = 480 | 8 | 30 dBm |
| L1 | f4 = 710 | 8 | 30 dBm |

In step 704, the SC performs an idle spectrum resource configuration decision.

According to the acquired idle spectrum resource list (Table 8) and the existing BS historical configuration information (Table 7), now at the idle spectrum f4, the transmitting power of the BS is 30 dBm; and since the transmitting power cannot be improved any longer due to the limitation of primary user protection, f4 cannot satisfy the coverage demand of the BS. The spectrum needs to be reconfigured. For the idle spectrums f1-f3, the SC configures the BS to perform channel interference measurement, and interference measurement results on the idle spectrums are: f1: −10 dBm; f2: −10 dBm; and f3: 0 dBm. According to calculation, under the upper limits of the maximum allowable transmitting power of the idle spectrums, the maximum average SINR (estimated SINR values) which may be obtained by edge users through configuring each idle spectrum by the BS are as shown in Table 9:

TABLE 9

| Frequency point MHz | Bandwidth MHz | Transmitting power | Historical interference value | Historical SINR | Actually measured interference value | Estimated SINR |
|---|---|---|---|---|---|---|
| f1 = 530 | 8 | 40 dBm | −10 dBm | 5 dB | −10 dBm | 5 dB |
| f2 = 560 | 8 | 40 dBm | −20 dBm | 10 dB | −10 dBm | 0 dB |
| f3 = 480 | 8 | 30 dBm | −15 dBm | 0 dB | 0 dBm | −15 dB |

The idle spectrum with the largest average SINR value of cell edge users is selected from all the idle spectrums as a reconfiguration target spectrum, and thus the average SINR value of the cell edge users can reach 5 dB when the transmitting power is 40 dBm at f1.

A result of the idle spectrum resource configuration decision forms a message which can be recognized by the BS.

In step 705, the SC transmits the result of the idle spectrum resource configuration decision to the BS.

Embodiment 6

Figure 8:
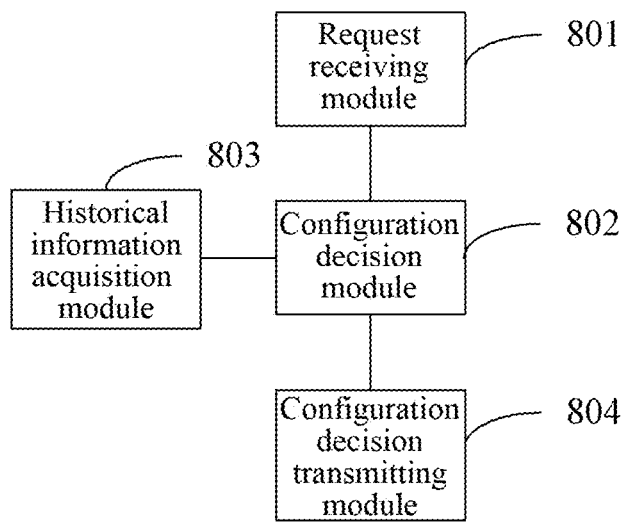
FIG. 8 is a structural schematic diagram of a device for configuring cognitive radio system spectrum resources provided by embodiment 6 of the present document.

The embodiment of the present document provides a device for configuring cognitive radio system spectrum resources. A structure of the device is as shown in FIG. 8. The device comprises:

a request receiving module 801 which is used to receive idle spectrum resource request information transmitted by secondary user equipment, and the idle spectrum resource request information indicates a demand of the secondary user equipment for idle spectrum resources; and a configuration decision module 802 which is used to perform an idle spectrum resource configuration decision for the secondary user equipment according to current idle spectrum resource information and historical configuration information of the idle spectrum resources of the secondary user equipment.

Preferably, the device further comprises:

a historical information acquisition module 803 which is used to acquire the historical configuration information of the idle spectrum resources of the secondary user equipment, the historical configuration information of the idle spectrum resources refers to network performance information reached by using the idle spectrum resources and historical usage information of primary system idle spectrum resources for the secondary user equipment.

Figure 9:
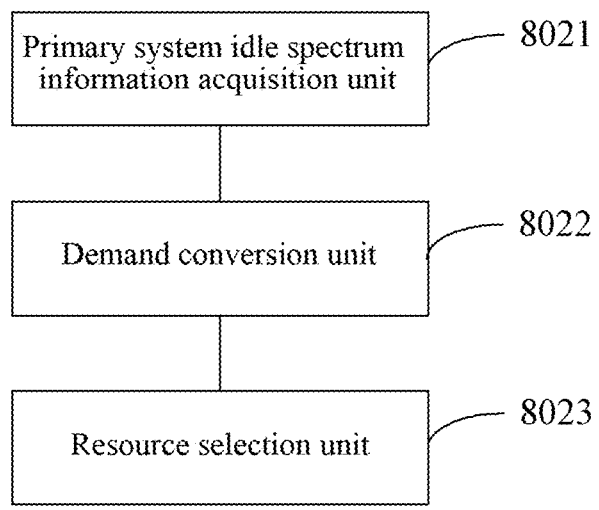
FIG. 9 is a structural schematic diagram of a configuration decision module 802 in FIG. 8.

Preferably, a structure of the configuration decision module 802 is as shown in FIG. 9 and the configuration decision module 802 comprises:

a primary system idle spectrum information acquisition unit 8021 which is used to acquire the primary system idle spectrum information from a database for saving primary system spectrum resource usage information or from a measurement report of the secondary user equipment;

a demand conversion unit 8022 which is used to convert idle spectrum request cause information and/or idle spectrum configuration target information into a performance demand of the secondary user equipment for idle spectrum; and a resource selection unit 8023 which is used to select an idle spectrum resource satisfying the performance demand from an idle spectrum list for the secondary user equipment according to performance that can be reached for the secondary user equipment in historical configuration of the idle spectrum resources, or perform priority ranking for idle spectrum resources according to performance that may be reached in historical configuration from high to low, and select an idle spectrum resource for the secondary user equipment.

Preferably, the device further comprises:

a configuration decision transmitting module 804 which is used to transmit a result of the idle spectrum resource configuration decision performed for the secondary user equipment to the secondary user equipment, wherein the result of the idle spectrum resource configuration decision comprises any one or more of the following:

configured frequency point, bandwidth, configuration time and maximum allowable transmitting power.

The device for configuring cognitive radio system spectrum resources may be integrated in the reconfiguration management node. In combination with the method for configuring cognitive radio system spectrum resources provided by any one of embodiments 1-6 of the present document, corresponding functions are completed by the reconfiguration node.

One ordinary person skilled in the art can understand that all or partial steps of the above-mentioned embodiments can be implemented by using a computer program flow, the computer programs can be stored in a computer readable storage medium, the computer programs are executed on corresponding hardware platforms (such as systems, equipment, apparatuses and devices, etc), and during execution, one or a combination of the steps of the method embodiments is included.

Alternatively, all or partial steps of the above-mentioned embodiments can also be implemented by using integrated circuits, and these steps can be respectively fabricated into integrated circuit modules, or a plurality of modules or steps thereof can be fabricated into a single integrated circuit module for implementation. Therefore, the present document is not limited to any specific combination of hardware and software.

Each device/function module/function unit in the above-mentioned embodiments can also be implemented by adopting general computing devices, can be integrated on a single computing device and can also be distributed in a network consisting of a plurality of computing devices.

When each device/function module/function unit in the above-mentioned embodiments is implemented in the form of software function module and is sold or used as an independent product, each device/function module/function unit can be stored in a computer readable storage medium. The above-mentioned computer readable storage medium can be a read only memory, a magnetic disk, a compact disk or the like.

Any one skilled in the art can easily conceive of variation or replacement within the technical range disclosed by the present document, but the variation or replacement shall also be included in the protection range of the present document. Therefore, the protection range of the present document shall be subjected to the protection range of claims.

INDUSTRIAL APPLICABILITY

The embodiments of the present document provide a method and a device for configuring cognitive radio system spectrum resources, a reconfiguration management node receives idle spectrum resource request information transmitted by secondary user equipment, the idle spectrum resource request information indicates a demand of the secondary user equipment for idle spectrum resources; and the reconfiguration management node performs an idle spectrum resource configuration decision for the secondary user equipment according to current idle spectrum resource information and historical configuration information of the idle spectrum resources of the secondary user equipment. Higher-efficiency idle spectrum resource configuration decision based on historical data is realized, and the problem that the existing resource configuration mode influences system stability is solved.

What we claim is:

1. A method for configuring cognitive radio system spectrum resources, comprising following steps that are executed by a processor in a reconfiguration management node:
   receiving idle spectrum resource request information transmitted by a secondary user equipment, wherein the idle spectrum resource request information indicates a demand of the secondary user equipment for idle spectrum resources;
   performing an idle spectrum resource configuration decision for the secondary user equipment according to current idle spectrum resource information and historical configuration information of the idle spectrum resources of the secondary user equipment, wherein the historical configuration information of the idle spectrum resources of the secondary user equipment comprises network performance information reached by using the idle spectrum resources and historical usage information of primary system idle spectrum resources for the secondary user equipment; and
   transmitting a result of the idle spectrum resource configuration decision performed for the secondary user equipment to the secondary user equipment.

2. The method for configuring cognitive radio system spectrum resources according to claim 1, wherein the idle spectrum resource request information comprises any one or more of the following:
   idle spectrum request indication information, idle spectrum request cause information and idle spectrum configuration target information.

3. The method for configuring cognitive radio system spectrum resources according to claim 2, wherein the idle spectrum request indication information comprises any one or more of the following:
   secondary user equipment location, equipment type, equipment parameter, demand for idle spectrum frequency point, demand for idle spectrum bandwidth, demand for idle spectrum idle duration, and demand for idle spectrum transmitting power,
   wherein the equipment parameter comprises one or more of the following: transmitter transmitting template, Adjacent Channel Leakage Ratio (ACLR), transmitting gain, antenna height, antenna direction angle, pitch angle, downward inclination angle, and polarization mode.

4. The method for configuring cognitive radio system spectrum resources according to claim 2, wherein the idle spectrum request cause information indicates a cause of triggering the secondary user equipment to make an idle spectrum request and comprises any one or more of the following: network overload, coverage range not as expected, cross-boundary coverage, communication interference higher than a preset threshold, service signal receiving power lower than a preset threshold, SINR lower than a preset threshold, and network performance parameter not meeting requirement.

5. The method for configuring cognitive radio system spectrum resources according to claim 4, wherein the network performance parameter not meeting requirement comprises any one or more of the following: throughput lower than a preset threshold, transmission rate lower than a preset threshold, bit error rate and/or block error rate and/or call drop rate higher than a preset threshold, RRC connection establishment success rate and/or E-RAB connection establishment success rate lower than a preset threshold, E-RAB establishment blocking rate higher than a preset threshold, and handover success rate lower than a preset threshold.

6. The method for configuring cognitive radio system spectrum resources according to claim 2, wherein the idle spectrum configuration target information indicates a performance index that is expected by the secondary user equipment and is to be reached by a network after the secondary user equipment configures idle spectrum and comprises any one or more of the following: spectrum resource satisfying a network load demand, coverage satisfying a demand, communication link interference lower than a preset threshold, service signal receiving power satisfying a minimum receiving threshold, SINR higher than a preset threshold, and network performance parameter meeting requirement.

7. The method for configuring cognitive radio system spectrum resources according to claim 1, wherein the current idle spectrum resource information indicates interference information on the idle spectrums and primary system idle spectrum information at a location of the current secondary user equipment.

8. The method for configuring cognitive radio system spectrum resources according to claim 1, wherein the method further comprises a following step that is executed by the processor in the reconfiguration management node: acquiring the historical configuration information of the idle spectrum resources of the secondary user equipment.

9. The method for configuring cognitive radio system spectrum resources according to claim 8, wherein:
the historical configuration information of the idle spectrum resources is acquired through measurement by the secondary user equipment itself or performance statistics of a network management system of a secondary system to which the secondary user equipment belongs after the secondary user equipment completes idle spectrum resource configuration, and the historical configuration information of the idle spectrum resources is transmitted by the secondary user equipment or the network management system to the reconfiguration management node;
the historical configuration information of the idle spectrum resources comprises any one or more of the following:
frequency point for configuring idle spectrum, bandwidth for configuring idle spectrum, location of the secondary user equipment, identification of the secondary user equipment, transmitting power of the secondary user equipment, antenna parameter of resource user equipment, usage duration, SINR on idle spectrum, service signal receiving power, interference power, and network performance information after the secondary user equipment configures the idle spectrum;
the network performance information comprises any one or more of the following: throughput, transmission rate, bit error rate, block error rate, coverage rate, RRC connection establishment success rate, E-RAB establishment success rate, E-RAB establishment blocking rate, call drop rate and handover success rate, of an idle spectrum cell.

10. The method for configuring cognitive radio system spectrum resources according to claim 9, wherein, performing an idle spectrum resource configuration decision for the secondary user equipment according to current idle spectrum resource information and historical configuration information of the idle spectrum resources of the secondary user equipment comprises:
acquiring the primary system idle spectrum information from a database for saving primary system spectrum resource usage information or from a measurement report of the secondary user equipment;
converting idle spectrum request cause information and/or idle spectrum configuration target information into a performance demand of the secondary user equipment for idle spectrum; and
selecting an idle spectrum resource satisfying the performance demand from an idle spectrum list for the secondary user equipment according to performance that can be reached for the secondary user equipment in historical configuration of the idle spectrum resources, or
performing priority ranking for idle spectrum resources according to performance that can be reached in historical configuration from high to low, and selecting an idle spectrum resource for the secondary user equipment.

11. The method for configuring cognitive radio system spectrum resources according to claim 10, wherein
the result of the idle spectrum resource configuration decision comprises any one or more of the following: configured frequency point, configured bandwidth, configuration time and maximum allowable transmitting power.

12. A device for configuring cognitive radio system spectrum resources, comprising: a processor, and a storage device storing processor executable instructions that when executed by the processor cause the processor to perform steps in following modules:
a request receiving module, configured to receive idle spectrum resource request information transmitted by a secondary user equipment, wherein the idle spectrum resource request information indicates a demand of the secondary user equipment for idle spectrum resources;
a configuration decision module, configured to perform an idle spectrum resource configuration decision for the secondary user equipment according to current idle spectrum resource information and historical configuration information of the idle spectrum resources of the secondary user equipment, wherein the historical configuration information of the idle spectrum resources of the secondary user equipment comprises network performance information reached by using the idle spectrum resources and historical usage information of primary system idle spectrum resources for the secondary user equipment; and
a configuration decision transmitting module, configured to transmit a result of the idle spectrum resource configuration decision performed for the secondary user equipment to the secondary user equipment.

13. The device for configuring cognitive radio system spectrum resources according to claim 12, wherein the storage device further stores processor executable instructions that when executed by the processor cause the processor to perform a step in a following module:
a historical information acquisition module, configured to acquire the historical configuration information of the idle spectrum resources of the secondary user equipment.

14. The device for configuring cognitive radio system spectrum resources according to claim 13, wherein the configuration decision module comprises:
a primary system idle spectrum information acquisition unit configured to acquire the primary system idle spectrum information from a database for saving primary system spectrum resource usage information or from a measurement report of the secondary user equipment;
a demand conversion unit configured to convert idle spectrum request cause information and/or idle spectrum configuration target information into a performance demand of the secondary user equipment for idle spectrum; and a resource selection unit configured to select an idle spectrum resource satisfying the performance demand from an idle spectrum list for the secondary user equipment according to performance that can be reached for the secondary user equipment in historical configuration of the idle spectrum resources, or perform priority ranking for idle spectrum resources according to performance that can be reached in historical configuration from high to low, and select an idle spectrum resource for the secondary user equipment.

15. The device for configuring cognitive radio system spectrum resources according to claim 12, wherein:
the result of the idle spectrum resource configuration decision comprises any one or more of the following: configured frequency point, configured bandwidth, configuration time and maximum allowable transmitting power.

* * * * *